United States Patent
Seaman et al.

(10) Patent No.: US 9,099,866 B2
(45) Date of Patent: Aug. 4, 2015

(54) APPARATUS, METHODS AND SYSTEMS FOR PARALLEL POWER FLOW CALCULATION AND POWER SYSTEM SIMULATION

(76) Inventors: Aden Seaman, Waterloo (CA); Oliver Romaniuk, Toronto (CA)

( * ) Notice: Subject to any disclaimer, the term of this patent is extended or adjusted under 35 U.S.C. 154(b) by 638 days.

(21) Appl. No.: 12/872,655

(22) Filed: Aug. 31, 2010

(65) Prior Publication Data

US 2011/0213606 A1 Sep. 1, 2011

Related U.S. Application Data

(60) Provisional application No. 61/238,912, filed on Sep. 1, 2009.

(51) Int. Cl.
G06G 7/54 (2006.01)
G06F 17/50 (2006.01)
H02J 3/00 (2006.01)

(52) U.S. Cl.
CPC .............. *H02J 3/00* (2013.01); *G06F 17/5009* (2013.01); *G06F 2217/78* (2013.01); *H02J 2003/007* (2013.01); *Y02E 60/76* (2013.01); *Y04S 40/22* (2013.01)
USPC ......................................................... 703/18

(58) Field of Classification Search
CPC ............ G06F 17/5009; G06F 2217/78; H02J 2003/007; Y02E 60/76
USPC .......................................................... 703/18
See application file for complete search history.

(56) References Cited

U.S. PATENT DOCUMENTS

| | | |
|---|---|---|
| 4,464,120 A | 8/1984 | Jensen |
| 4,545,767 A | 10/1985 | Suzuki et al. |
| 5,262,960 A | 11/1993 | Said et al. |
| 5,278,778 A | 1/1994 | Akimoto et al. |
| 5,317,525 A | 5/1994 | Taoka et al. |
| 7,117,070 B2 * | 10/2006 | Chow et al. ................... 700/297 |

(Continued)

OTHER PUBLICATIONS

C. H. Liang, NPL, "Parallel Optimal Reactive Power Flow based on Cooperative Co-Evolutionary Differential Evolution and Power System Decomposition", IEEE, 2007.*

(Continued)

*Primary Examiner* — Omar Fernandez Rivas
*Assistant Examiner* — Angel Calle
(74) *Attorney, Agent, or Firm* — Bereskin & Parr LLP

(57) ABSTRACT

According to one aspect, an apparatus for computing a solution to a power flow problem for an electrical power system comprising a plurality of buses. The apparatus includes (a) at least one processor comprising a plurality of cores; and (b) memory coupled to the at least one processor for storing an admittance matrix for the power system, real power and reactive power for each bus, and an initial complex voltage for each bus; (c) wherein the at least one processor is configured to: (i) perform a Jacobi power flow calculation for each bus to determine the complex voltage for each bus, the Jacobi power flow calculation using the admittance matrix, the real power and reactive power for each bus, and the initial complex voltage for each bus as inputs, wherein at least two Jacobi power flow calculations are performed concurrently on the plurality of cores; (ii) calculate a power mismatch at each bus based on the complex voltages; and (iii) determine whether the Jacobi power flow calculations have converged based on the power mismatch and repeat (i) to (iii) if the Jacobi power flow calculations have not converged.

21 Claims, 4 Drawing Sheets

(56) References Cited

U.S. PATENT DOCUMENTS

| | | | |
|---|---|---|---|
| 8,326,594 B2* | 12/2012 | Sun | 703/18 |
| 2006/0229767 A1* | 10/2006 | Chu et al. | 700/286 |
| 2007/0203658 A1 | 8/2007 | Patel | |
| 2008/0021679 A1 | 1/2008 | Bleiweiss et al. | |
| 2008/0122518 A1 | 5/2008 | Besser et al. | |
| 2009/0228154 A1* | 9/2009 | Trias | 700/295 |
| 2009/0292520 A1* | 11/2009 | Nwankpa et al. | 703/18 |

OTHER PUBLICATIONS

K. Tomsovic, NPL< "Power System Analysis", Nov. 2004.*

J. L. Kirtley Jr. NPL, "Introduction to power systems Class notes Chapter 5 Introduction to Load Flow", 2003.*

Goran Andersson, NPL, "Modelling and Analysis of Electric power systems", Sep. 2008.*

Arun Nagari, NPL, "Parallel Processing Architecture for Solving Large Scale Linear systems", Aug. 15 2009, (Google).*

Ahmed H. Sameh, on Jacobi and Jacobi-Like Algorithms for a Parallel Computer, Center for Advanced Computation University of Illinois at Urbana-Champaign, Urbana, Illinois 61801 USA, Dec. 11, 1972.

David P. Chassin, Peter R. Armstrong, Daniel G. Chavarria-Miranda and Ross T. Guttromson, Gauss-Seidel Accelerated: Implementing Flow Solvers on Field Programmable Gate Arrays, Pacific Northwest National Laboratory, Richland, Washington, 99352 USA, 2006.

C.H. Liang, C.Y. Chung, K.P. Wong, X.Z. Duan, Parallel Optimal Reactive Power Flow Based on Cooperative Co-Evolutionary Differential Evolution and Power System Decomposition. IEEE Transactions on Power Systems, vol. 22, No. 1, Feb. 2007.

J.L. Kirtley Jr. Massachusetts Institute of Technology Department of Electrical Engineering and Computer Science 6.061 Introduction to Power Systems Class Notes Chapter 5 Instroduction to Load Flow. 2003.

K. Tomsovic and V.Venkatasubramanian. Power System Analysis. School of Electrical Engineering and Computer Science, Washington State University, Pullman, WA. Undated, The electrical Engineering Handbook, Chapter 7, Published 2005.

Goran Anderson. Modelling and Analysis of Electric Power Systems. Power Flow Analysis. Fault Analysis. Power Systems Dynamics and Stability. Lecture 227-0526-00, ITET ETH Zurich Sep. 2008.

Arun Nagari, Parallel Processing Architecture for Solving Large Scale Linear Systems, University of Tennessee, Knoxville, Trace:Tennessee Research and Creative Exchange, Aug. 2009.

* cited by examiner

APPARATUS, METHODS AND SYSTEMS FOR PARALLEL POWER FLOW CALCULATION AND POWER SYSTEM SIMULATION

RELATED APPLICATIONS

This application claims the benefit of U.S. Provisional Patent Application Ser. No. 61/238,912 filed Sep. 1, 2009, the entire contents of which are incorporated by reference herein for all purposes.

FIELD

Embodiments described herein relate to apparatus, methods and systems for computing a solution to the power flow (load flow) problem and dynamically simulating a power system. In particular, the embodiments described herein relate to apparatus, methods and systems for computing a solution to the power flow problem and dynamically simulating a power system using parallel processing.

INTRODUCTION

Power system simulators, state estimators and economic optimal power flow calculators are core to the reliability of modern electricity systems and are used to plan, simulate, predict and control the state of every major electricity jurisdiction. They are also often used to perform desktop studies and analyses of theoretical systems. The prevalent operational model for power system control utilizes a centralized system, where Supervisory Control and Data Acquisition (SCADA) information from across the jurisdiction is transmitted to one or more Grid Control Centers (GCC), often owned and operated by the Independent System Operator (ISO). At the GCC, high-powered computers perform complex mathematical calculations to determine the current state of the system and any control actions required to maintain stability. In addition, power system engineers worldwide use similar tools to perform studies and analyses of hypothetical systems.

The basis for many of the calculations integral to these power system tools is the Power Flow (PF). Given the physical characteristics of the power system to be studied, as well as inputs regarding generation and load, the PF calculates the voltage at every bus in the power system, as well as the real and reactive power levels required to balance supply and demand and keep voltages near nominal values. The calculated values can be compared to actual measurements in order to verify the state of the actual power system, and the results can be used to dispatch generation across the electrical jurisdiction.

Since the PF is a simulated version of the power system, alternate (i.e. theoretical) values can be used as inputs to provide operators with estimates of the potential state of the power system under hypothesized conditions. This is an extremely useful analysis for contingency planning, such as generator forced outages, transmission line failures and rapid load changes. These potential system states are put into the PF to estimate the condition of the power system after such changes. System operators can make decisions that ensure a stable system taking into account the current state of the system, as well as any potential system configurations after hypothetical system changes.

The PF is a static method, providing a snapshot of the power system at any given moment in time. Specifically the PF is a tool used to find system voltages and real and reactive power levels in steady-state. In its basic form it does not contain any time based information and does not provide any information regarding the dynamics of the power system. A power system simulator, on the other hand, attempts to dynamically find the resulting system state based on given generation and load levels.

In the case of real power, if generation and load are not in balance, then the PF calculates the generation change required in order to balance the system. In a simulation the power imbalance manifests itself as a frequency deviation, upon which a control system or control systems can act to correct the imbalance, showing the dynamic results of the control actions as time progresses.

This is also true for reactive power output in that the PF calculates required reactive power levels to maintain desired (predetermined) bus voltages. In simulation, bus voltages are largely a function of the reactive output of generators at their respective buses. The duty of maintaining desired bus voltages lies with the generator control systems.

Normally, the PF is used to provide a single snapshot of the state of the system. With some modifications it is possible to utilize the PF to provide a large number of successive snapshots, each slightly different from the previous to provide a dynamic simulation. Some obstacles to using the PF to implement a power system simulator include the large number of calculations required to performed the PF and the fact that the PF does not contain any information regarding the frequency of the system, a key indicator of power system state.

SUMMARY

Embodiments described herein relate to apparatus, methods and systems for computing a solution to the power flow problem and dynamically simulating a power system using parallel processing.

In one broad aspect there is provided a method for computing a solution to a power flow problem for an electrical power system comprising a plurality of buses. The method includes: (a) providing an admittance matrix for the power system; (b) initializing real and reactive power for each bus; (c) initializing complex voltages for each bus; (d) performing a Jacobi power flow calculation for each bus to determine the complex voltage for each bus, the Jacobi power flow calculation using the admittance matrix, real and reactive power for the plurality of buses, and initial complex voltages for the plurality of buses as inputs, wherein at least two Jacobi power flow calculations are performed concurrently on a plurality of parallel processors; (e) determining a power mismatch at each bus based on the complex voltage for each bus; (f) determining whether the Jacobi power flow calculations have converged based on the power mismatches; and (g) if the Jacobi Raw power flow calculations have not converged, repeating steps (d) to (g).

The method may further include (h) adjusting the real power and reactive power of at a least one bus based on the power mismatches.

The method may further include determining whether the Jacobi power flow calculations have reached a steady state and completing step (h) only when the Jacobi power flow calculations are not in the steady state. The Jacobi power flow algorithms may be in the steady state when the power mismatch at each bus is below a predetermined threshold.

Alternatively, the method may further include (h) calculating a frequency of the power system using the power mismatch of at least one bus; (i) estimating the real and reactive power for each bus to achieve a steady state using a control system model, the control system model using at least one of the system frequency, power mismatches and complex voltages as an input; and (j) repeating steps (d) to (j).

The plurality of buses may include a reference bus and the system frequency is calculated from the power mismatch of the reference bus. The system frequency may be calculated using a generator swing equation. The system frequency may be based on a frequency change calculated in accordance with the following equation $$\Delta\omega(t) = \frac{\omega_{sym}\{Re(\Delta S_{Bus1})\}\Delta t}{2H\omega_{p.u.}(t)}$$

wherein $\Delta\omega(t)$ is the frequency change, $\omega_{syn}$ is a synchronous frequency of the power system, $\omega_{p.u.}(t)$ is a per unit system frequency at time t, H is a rotational inertia constant of the power system, $\Delta t$ is a time step from a previous iteration, and $\Delta S_{Bus1}$ is the power mismatch of the reference bus.

Performing the Jacobi power flow calculation may include solving the following equation $$V_k(i+1) = \frac{1}{Y_{kk}}\left[\frac{S_k^*}{V_k^*(i)} - \sum_{n=1, n\neq k}^{N} Y_{kn}V_n(i)\right]$$

wherein V is the complex voltage, Y is an admittance of the admittance matrix, S is a complex power, k and n represent specific buses, an asterisk superscript indicates a complex conjugate, and i is an iteration number.

Each bus may be treated as a load bus during the Jacobi power flow calculations.

The plurality of parallel processors may form at least one graphics processing unit.

In another broad aspect there is provided a system for computing a solution to a power flow problem for an electrical power system comprising a plurality of buses. The system includes: (a) at least one memory module for storing an admittance matrix for the power system, real power and reactive power for each bus, and initial complex voltage for each bus; and (b) at least one parallel processor module coupled to the at least one memory module for: (i) performing a Jacobi power flow calculation for each bus to determine the complex voltage for each bus, the Jacobi power flow calculation using the admittance matrix, real power and reactive power for each bus, and the complex voltage for each bus as inputs, wherein at least one parallel processor module comprises a plurality of independent cores and at least two Jacobi Raw Power Flow calculations are performed concurrently on the plurality of cores; (ii) calculating a power mismatch at each bus based on the complex voltages; and (iii) determining whether the Jacobi power flow calculations have converged based on the power mismatches and repeating (i) to (iii) if the Jacobi power flow calculations have not converged The system may also include a steady state flag calculation module for receiving the power mismatch for each bus and determining whether the Jacobi power flow calculations are converged. The steady state flag calculation module may determine whether the Jacobi power flow calculations are converged when the power mismatch of each bus is below a predetermined threshold.

The system may also include (c) a system frequency calculation module for receiving the power mismatch for at least one bus and calculating a system frequency using the power mismatch of the at least one bus; and (d) a real and reactive power calculation module for estimating the real and reactive power vectors for each bus to achieve a steady state using a control system model, the control system model using at least one of the system frequency, power mismatches, and complex voltages as input.

The system frequency calculation module may calculate the system frequency using a generator swing equation.

The plurality of buses may include a reference bus and the system frequency calculation module may calculate the system frequency based on the power mismatch of the reference bus. The system frequency calculation module may determine the system frequency from a frequency change calculated in accordance with the following equation $$\Delta\omega(t) = \frac{\omega_{syn}\{Re(\Delta S_{Bus1})\}\Delta t}{2H\omega_{p.u.}(t)}$$

wherein $\Delta\omega(t)$ is the frequency change, $\omega_{syn}$ is a synchronous frequency of the power system, $\omega_{p.u.}(t)$ is a per unit system frequency at time t, H is a rotational inertia constant of the power system, $\Delta t$ is a time step from a previous iteration, and $\Delta S_{Bus1}$ is the power mismatch of the reference bus.

Performing the Jacobi power flow calculation may include solving the following equation $$V_k(i+1) = \frac{1}{Y_{kk}}\left[\frac{S_k^*}{V_k^*(i)} - \sum_{n=1, n\neq k}^{N} Y_{kn}V_n(i)\right]$$

wherein V is the complex voltage, Y is an admittance of the admittance matrix, S is a complex power, k and n represent specific buses, an asterisk superscript indicates a complex conjugate, and i is an iteration number.

Each bus may be treated as a load bus during the Jacobi power flow calculations.

The at least one parallel processor module may be a graphics processing unit.

In another broad aspect, there is provided an apparatus for computing a solution to a power flow problem for an electrical power system comprising a plurality of buses. The apparatus includes: (a) at least one processor comprising a plurality of cores; and (b) memory coupled to the at least one processor for storing an admittance matrix for the power system, real power and reactive power for each bus, and an initial complex voltage for each bus; (c) wherein the at least one processor is configured to: (i) perform a Jacobi power flow calculation for each bus to determine the complex voltage for each bus, the Jacobi power flow calculation using the admittance matrix, the real power and reactive power for each bus, and the initial complex voltage for each bus as inputs, wherein at least two Jacobi power flow calculations are performed concurrently on the plurality of cores; (ii) calculating a power mismatch at each bus based on the complex voltages; and (iii) determining whether the Jacobi power flow calculations have converged based on the power mismatch and repeating (i) to (iii) if the Jacobi power flow calculations have not converged.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
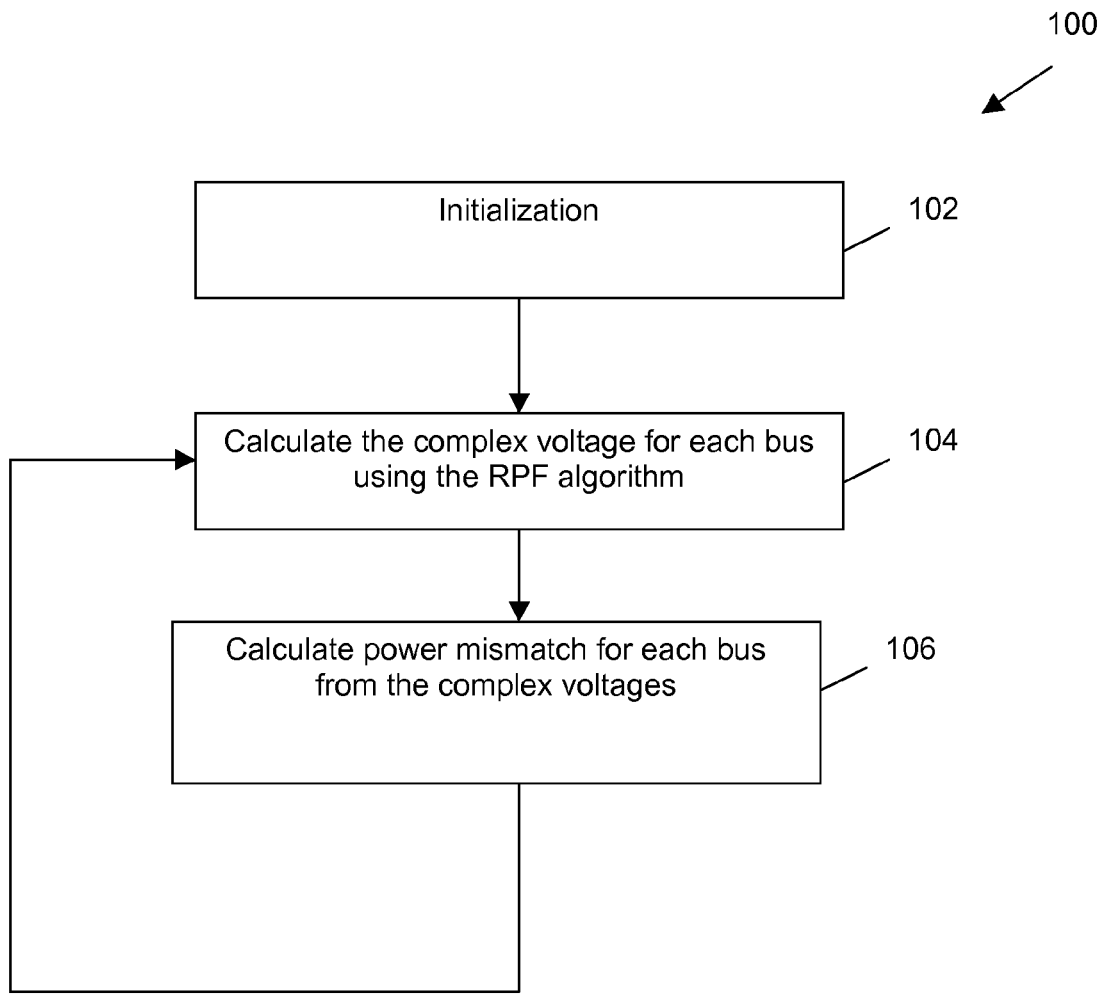
FIG. 1 is a flowchart of a method for computing a solution to the power flow equations in accordance with an embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Some embodiments described herein relate to apparatus, systems and methods for computing a solution to the power flow equations using parallel processing. In one embodiment, the method implements a modified and simplified version of a standard power flow algorithm, referred to herein as the Raw Power Flow (RPF) algorithm. The RPF algorithm outputs (i) the complex voltage of each bus in the electrical power system; and (ii) the power mismatch for each bus. In some embodiments, the complex voltage is described and processed in terms of its polar coordinates—i.e. its magnitude and phase components. In other embodiments, the complex voltage is described and processed in terms of its rectangular coordinates—i.e. its real and imaginary components. The modifications to the standard power flow algorithm include the removal of the control aspect of the power flow algorithm. Specifically, with the control aspect removed, the RPF algorithm no longer attempts to automatically balance the power system. Accordingly, the RPF algorithm is incapable of maintaining generation/load balance and bus voltages at set-point levels. The resulting real power imbalance manifests itself in a mismatch value.

In some embodiments, the RPF algorithm is solved using an iterative Jacobi method, which makes the problem "embarrassingly parallel". In parallel computing, an embarrassingly parallel workload (or "embarrassingly parallel" problem) is one for which little or no effort is required to separate the problem into a number of parallel tasks. This is often the case where there exists no dependency (or communication) between those parallel tasks. In these embodiments, the RPF algorithm can be rapidly computed using a plurality of parallel processors, which significantly decreases the time to solve the RPF algorithm. In one specific embodiment, the RPF algorithm is implemented on one or more graphics processing units (GPU).

Other embodiments described herein relate to apparatus, systems and methods for computing a solution to the power flow problem using the RPF algorithm. The objective of the power flow problem is to achieve a predetermined steady state given a set of input values. Since the control aspect of the standard power flow algorithm has been removed from the RPF algorithm, to produce a complete solution to the power flow problem, the control aspect must be re-introduced. In some embodiments, the control aspect is re-introduced by adjusting the power supplied by the reference bus based on the mismatch of the reference bus calculated by the RPF algorithm.

Other embodiments described herein relate to apparatus, system and methods for simulating an electrical power system using the RPF algorithm. Since the solution to a power flow problem provides a snapshot of the state of a power system it is possible to utilize the power flow problem to provide a large number of successive snapshots, each slightly different from the previous to provide a dynamic simulation. However, most power system control models use frequency as the input, not power mismatch, thus the simulation methods include calculating the frequency of the system. In some embodiments, the frequency of the system is calculated from the mismatch of the reference bus calculated by the RPF algorithm using a swing equation.

Reference is made to FIG. 1 wherein a method 100 of computing a solution to the power flow equations for an electrical power system having a plurality of buses is illustrated.

At (102), an initialization is performed. In order to be able to calculate the power flow in an electrical power system, the physical characteristics of the power system are required. This is typically provided in the form of a Ybus matrix, which contains the admittances of every static device in the system. The Ybus typically has the format shown in equation (1) wherein the admittances $Y_{11}, Y_{22}, \ldots, Y_{nn}$ are called the self-admittances of the nodes, and each equals the sum of all the admittances terminating on the node identified by the repeated subscript. The other admittances are the mutual admittances of the nodes, and each equals the negative of the sum of all admittances connected directly between the nodes identified by the double subscripts.

$$\begin{bmatrix} Y_{11} & Y_{12} & \ldots & Y_{1n} \\ Y_{21} & Y_{22} & \ldots & Y_{2n} \\ \ldots & \ldots & \ldots & \ldots \\ Y_{n1} & Y_{n2} & \ldots & Y_{nn} \end{bmatrix} \quad (1)$$

The Ybus matrix is typically symmetric, however, it may be asymmetric if certain devices, such as phase-shifting transformers, are present in the system. The initialization typically includes defining and providing the Ybus matrix.

Initialization also typically includes providing an initial complex voltage for each bus in the power system. In some embodiments, each of the initial complex voltages is set to a predetermined value. For example, each bus may be assigned a magnitude of 1 and a phase of 0 per unit. This is often referred to as a "flat" start. In other embodiments, the initial complex voltages are selected to be close to the final solution, if known, or an educated estimate, if unknown. This reduces the convergence time.

At (104), the complex voltage of each bus is calculated using a modified power flow algorithm, referred to herein as the Raw Power Flow (RPF) algorithm.

The RPF algorithm attempts to solve the set of equations, or a mathematical rearrangement thereof, referred to as the power flow equations. The power flow equations are shown in equation (2) where $S_k$ is the complex power of the $k^{th}$ bus, $P_k$ is the real power of the $k^{th}$ bus, $Q_k$ is the reactive power of the $k^{th}$ bus, $V_k$ is the voltage of the $k^{th}$ bus, $V_n$ is the voltage of the $n^{th}$ bus, $Y_{kn}$ is the admittance from the Ybus matrix, j is the imaginary number $\sqrt{-1}$, and N is the number of buses. The complex power S, voltage V and admittances Y are complex numbers.

$$S_k = P_k + jQ_k = V_k \left[ \sum_{n=1}^{N} Y_{kn} V_n \right] \quad (2)$$

The power at the $k^{th}$ bus is found using the difference between the generation (G) and load (L) at the bus as shown in equations (3) and (4).

$$P_k = P_{Gk} - P_{Lk} \quad (3)$$

$$Q_k = Q_{Gk} - Q_{Lk} \quad (4)$$

There are several methods for solving the power flow equations. The three primary methods are the Newton-Raphson method, the Gauss-Seidel method and the Jacobi method, each of which has various serial and parallel implementations. In some embodiments described herein, the Jacobi method is used to solve the power flow equations. The Jacobi method involves iteratively performing or solving equation (5), where i is the iteration number:

$$V_k(i+1) = \frac{1}{Y_{kk}} \left[ \frac{P_k - jQ_k}{V_k^*(i)} - \sum_{n=1}^{k-1} Y_{kn} V_n(i) - \sum_{n=k+1}^{N} Y_{kn} V_n(i) \right] \quad (5)$$

Equation (5) can be re-written as equation (6) where an asterisk superscript (e.g. $S^*_k$) indicates the complex conjugate of the variable:

$$V_k(i+1) = \frac{1}{Y_{kk}} \left[ \frac{S_k^*}{V_k^*(i)} - \sum_{n=1, n \neq k}^{N} Y_{kn} V_n(i) \right] \quad (6)$$

It can be seen by inspection of equation (6) that each iteration (i+1) uses the voltage V(i) calculated in the previous iteration.

When computing the power flow, there is generally one instance of equation (6) for every bus in the power system. For example, a 2000 bus system would have 2000 equations, labeled $V_1(i+1)$ to $V_{2000}(i+1)$. It can be seen by inspection of equation (6) that for every bus, the calculation does not depend on the calculation being performed for any other bus, thus the voltage of multiple buses can be calculated simultaneously (i.e. in parallel). Therefore the natural parallelism inherent to the Jacobi algorithm allows for a simple and effective implementation on parallel hardware. Accordingly, in theory if there were the same number of processors as the number of buses, an iteration of an RFP algorithm could be completed in the same time as the time to calculate the voltage for one bus. For example, a 2000 bus system could use 2000 processors to complete all 2000 calculations in the same time it typically takes to complete just one calculation. However, in practice, memory bandwidth issues when performing the summation do not allow all the calculations to be completed so quickly. In some embodiments, the number of processors is less than the number of buses, but greater than one, allowing at least two of the calculations to be performed in parallel.

The voltages are iteratively calculated and converge towards the true solution for the voltage values. Where the RPF algorithm is solved using the Jacobi algorithm, the combined solution method will be referred to herein as the Jacobi Raw Power Flow (JRPF) algorithm.

The buses in a power system are typically divided into one of three types: swing bus (also referred to as a reference bus), load bus (also referred to as a PQ bus) and voltage bus (also referred to as a PV bus). There is typically only one swing bus and it is used as the voltage reference bus. In standard power flow calculations, the swing bus contains the swing generator. In power flow studies, the loads and desired generator set points are typically known in advance and used within the power flow. What is unknown is the losses and imbalance in the system. For this reason, the real power output of the generator at the reference bus is allowed to change (i.e. swing) and absorb the losses and imbalance to produce a balanced steady-state solution for the system. Accordingly, the standard power flow algorithm involves calculating the real and reactive powers ($P_{Gk}$ and $Q_{Gk}$) of the swing or reference bus.

At load buses, the real and reactive power ($P_k$ and $Q_k$) are given as inputs and the standard power flow algorithm calculates the complex voltage, that is the voltage magnitude (V) and phase ($\delta$).

Buses with generators or other sources of controllable reactive power (Q) (other than the reference bus) are considered to be PV buses. At these buses, the bus voltage magnitude is held constant and the standard power flow algorithm solves for the reactive power ($Q_k$) and the voltage phase ($\delta$). The three types of buses used in the standard PF algorithm and their parameters are summarized in Table 1.

TABLE 1

| Bus Type | Given | Solved |
| --- | --- | --- |
| Swing (Reference) | V, $\delta$ | P, Q |
| Load (PQ) | P, Q | V, $\delta$ |
| Voltage (PV) | P, V | Q, $\delta$ |

Accordingly, in the standard power flow algorithm the output of the real and reactive power set points of certain generators at the reference bus and PV buses are actively changed. Specifically, the standard power flow algorithm maintains the voltage of the reference bus to a desired value allowing the real power (P) and the reactive power (Q) to change. However, in the RPF algorithm, the control aspect of the standard power flow algorithm is removed.

In particular, while the constant voltage of the reference bus is maintained, the part of the standard power flow algorithm that calculates the real and reactive powers of the reference bus is removed. Accordingly, the reference bus is treated as a load bus, but maintaining a constant voltage.

Since any mismatch in real power is not automatically relieved, at the end of the RPF algorithm, the reference bus will have a residual mismatch that reflects the generation/load imbalance in the power system. (i.e. the system will have converged but not be in steady state).

Similar changes are made to the treatment of the voltage-constrained buses (PV buses) where standard power flow algorithms modify the reactive power output of a generator or synchronous condenser to obtain the desired bus voltage. In the RPF algorithm, it is desired that the bus voltage reflect the actual reactive output of the generator. Therefore, all buses on the power system are considered to be load (PQ) buses that have set real and reactive power levels.

A revised set of bus types used by the RPF algorithm and their parameters is summarized in Table 2.

TABLE 2

| Bus Type | Given | Solved |
| --- | --- | --- |
| Reference | P, Q, δ, V | Mismatch |
| Load (PQ) | P, Q | V, δ |

At (106), the power mismatch of each bus is calculated from the Ybus matrix, the real and reactive powers, and the complex voltages (magnitude and phase) calculated at (104).

The power mismatch of the buses may then be used to determine the sufficiency of the complex voltages calculated at (104). The mismatch of a particular bus $\Delta S_k$ is the difference between the known and calculated complex powers S at the bus. The difference between the known and calculated powers at a particular bus may be calculated using equation (7) where $S_k$ is the known power at the $k^{th}$ bus, $V_k$ is the calculated voltage at the $k^{th}$ bus, $V_n$ is the calculated voltage at the $n^{th}$ bus, and $Y_{kn}$ is the corresponding Ybus matrix value:

$$\Delta S_k = S_k - V_k \left[ \sum_{n=1}^{N} Y_{kn} V_n \right] \quad (7)$$

If there is a significant difference between the two, (i.e. $\Delta S_k$ is larger than a predetermined threshold) then the RPF algorithm has yet to find an accurate solution for that bus. If there is a small difference between the two (i.e. $\Delta S_k$ is smaller than the predetermined threshold) then the RPF algorithm is close to finding a solution for that bus. If all of the buses except the reference bus are near a solution, then the RPF algorithm is said to have converged. If all the buses (including the reference bus) are near a solution, the system is said to be in steady state.

Typically the Jacobi method takes more iterations to converge than the Newton-Raphson and Gauss-Seidel methods. This is the main reason why the Jacobi method fell to the wayside as a preferred method for solving the PF. However, as described above, the Jacobi algorithm lends itself naturally to parallel processing as each of the equations is independent of the other equations during each iteration. Given the advances in parallel computing hardware and software, the advantages provided by the natural parallelism inherent to the Jacobi algorithm outweigh the disadvantage of the increased number of iterations. Once the power mismatches have been calculated, the method 100 proceeds back to (104).

Figure 2:
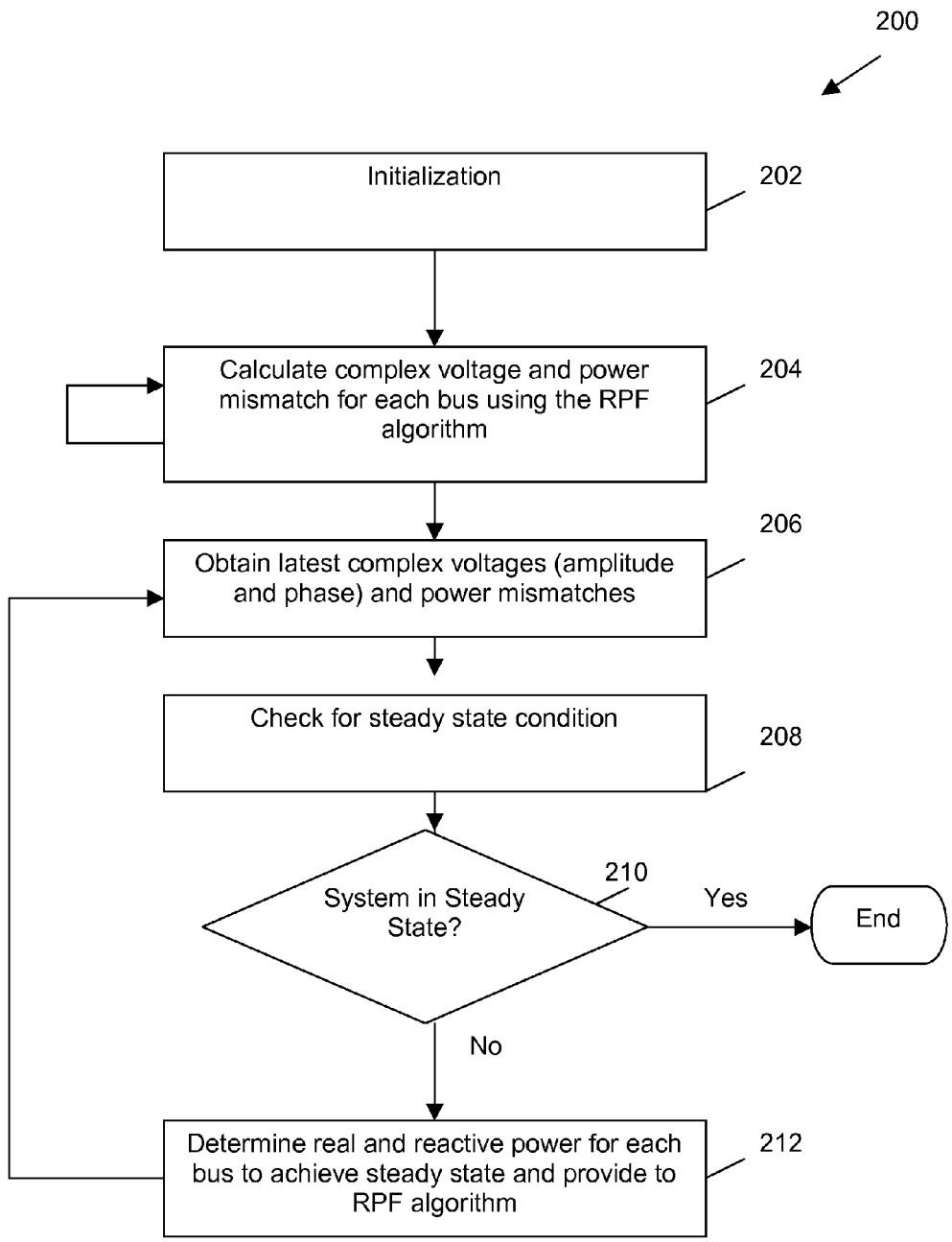
FIG. 2 is a flowchart of a method for computing a solution to the power flow problem using the method of FIG. 1 in accordance with an embodiment.

Reference is now made to FIG. 2, which illustrates a method 200 of calculating a solution to the power flow problem using the RPF algorithm of FIG. 1 in accordance with an embodiment. The objective of the power flow problem is to achieve a predetermined steady state given a set of input values. Since the control aspect of the standard power flow algorithm has been removed from the RFP algorithm, to produce a complete solution to the power flow problem, the control aspect must be re-introduced. In the embodiment shown in FIG. 2, the control aspect is re-introduced by adjusting the power produced by the reference bus based on the mismatch of the reference bus. In other embodiments, other suitable control models may be used to adjust the power produced by one or more buses.

At (202), an initialization process is executed. The initialization process typically includes providing the following: (i) the Ybus matrix for the power system; (ii) initial real and reactive power for each bus in the system; and (iii) initial complex voltages (magnitude and phase) for each bus in the system. After the initialization process has been executed, the method 200 proceeds to (204).

At (204), the RPF algorithm described above in reference to FIG. 1 is used to determine (i) the complex voltage (magnitude and phase) of each bus and (ii) the power mismatch of each bus. As described above in reference to steps (104) and (106) of method 100, the RPF algorithm includes solving equation (6) for the complex voltage (magnitude and phase) of each bus and then determining the power mismatch using the calculated complex voltages. As described above in reference to FIG. 1, the RPF algorithm continuously and iteratively calculates the complex voltages (magnitude and phase) for each voltage based on the system parameters provided.

At (206), the latest complex voltages (magnitude and phase) and power mismatches calculated at (204) are obtained. In some embodiments, the complex voltages (magnitude and phase) and the power mismatches are obtained after a certain number of iterations of the RPF algorithm. In other embodiments, the complex voltages (magnitude and phase) and the power mismatches are obtained after a certain period of time has elapsed since the previous complex voltages (magnitude and phase) and power mismatches were obtained.

At (208) the power mismatches obtained at (206) are used to determine whether the power system is in a predetermined steady state. In some embodiments, the system is said to be in a steady state when the power mismatch for each bus is below a predetermined threshold. When the power system has reached the steady state, the resulting solution is the same as that of the one produced by the standard power flow algorithm. In effect, the dynamic and cyclic method of finding a solution to the power flow problem results in an identical solution to that of the standard power flow algorithm using a different method.

At decision diamond (210), if the system is in the steady state then the method 200 ends. Otherwise, the method 200 proceeds to (212).

At (212) the complex voltages (magnitude and phase) or power mismatches, or both, are used to determine the changes in the real and reactive set points of the generators to achieve the predetermined steady state. The new real and reactive set points are then provided to the RPF algorithm which continues to calculate new complex voltages (magnitude and phase) and power mismatches using these new real and reactive set points. The new real and reactive set points produce changes in the results of the RPF algorithm, resulting in further changes to the set points calculated at (212). This cycle is repeated until the predetermined steady state condition is achieved.

Figure 3:
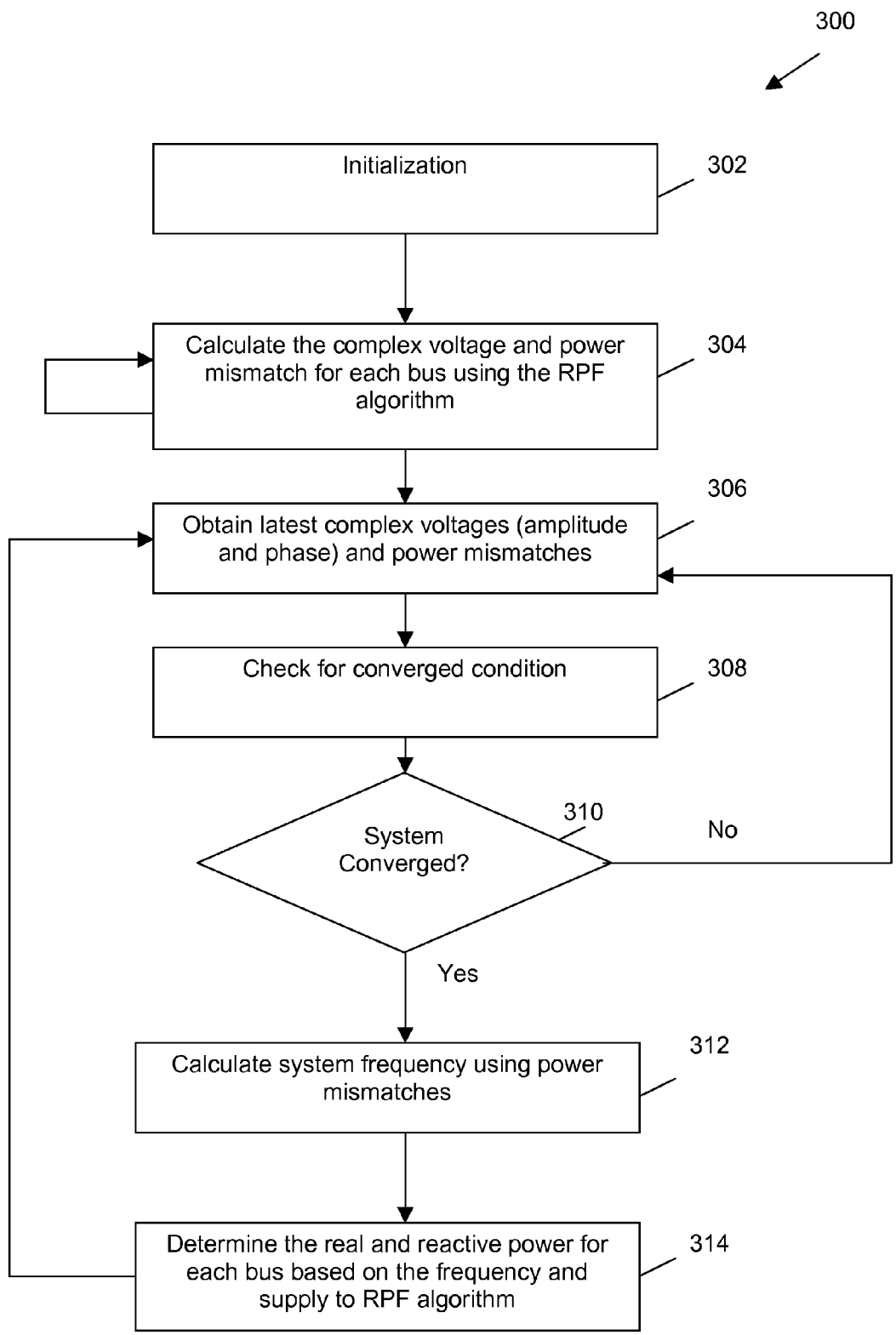
FIG. 3 is a flowchart of a method for simulating a power system using the method of FIG. 1 in accordance with an embodiment.

Reference is now made to FIG. 3, wherein a method 300 for simulating a power system using the RFP algorithm described in reference to FIG. 1 is illustrated. Since the solution to a power flow problem provides a snapshot of the state of a power system it is possible to utilize the power flow problem to provide a large number of successive snapshots, each slightly different from the previous to provide a time-based simulation. However, most power system control models use frequency as the input, not power mismatch, thus the simulation method described herein also calculates the frequency of the system.

At (302), an initialization process is executed. The initialization process typically includes providing the following: (i)

the Ybus matrix for the power system; (ii) initial real and reactive power for each bus in the system; and (iii) initial complex voltages (magnitude and phase) for each bus in the system; and (iv) load and generator models. After the initialization process has been executed, the method 300 proceeds to (304).

At (304), the RPF algorithm described above in reference to FIG. 1 is used to determine (i) the complex voltage (magnitude and phase) of each bus and (ii) the power mismatch of each bus. As described above in reference to steps (104) and (106) of method 100, the RPF algorithm includes solving equation (6) for the complex voltage (magnitude and phase) of each bus and then determining the power mismatch using the calculated complex voltages. As described above in reference to FIG. 1, the RPF algorithm continuously and iteratively calculates the complex voltages (magnitude and phase) for each voltage based on the system parameters provided.

At (306), the most recent complex voltages (magnitude and phase) and power mismatches calculated at (304) are obtained.

At (308), the complex voltages (magnitude and phase) and power mismatches obtained at (306) are used to determine whether the RPF algorithm has converged. In some embodiments, the RPF algorithm and thus the system is said to converge when the power mismatch of all of the buses except the reference bus is less than a predetermined threshold. Note that while the terms "converge" and "steady state" are related, they are separate and distinct. A system is said to be in the steady state only if the power mismatch of ALL of the buses (including the reference bus) is less than a predetermined threshold. A system is said to have converged if the power mismatch of all of the buses other than the reference bus is less than a predetermined threshold. Therefore, for the system to be in a steady state it also must have converged, but the converse is not true. Specifically, a system can be converged, but not in the steady state. In some embodiments, the same predetermined threshold is used for all of the buses. In other embodiments, different buses may have different predetermined thresholds.

At (310), if the system has not converged then the method 300 proceeds back to (306). If, however, the system has converged then the method 300 proceeds to (312).

At (312), the power mismatches obtained at (306) are used to determine the system frequency ω. In some embodiments, the system frequency is calculated from the real component of the reference bus mismatch using a version of the swing equation.

The fundamental equation describing a rotating machine is the swing equation. The swing equation is based on Newton's Second Law with modifications for the purposes of using power system inputs such as system frequency, normalized generator inertia constants and per unit powers.

The swing equation is shown in equation (8) where H is the normalized generator rotational inertia constant, $\omega_{syn}$ is the synchronous frequency of the system, $\omega_{p.u.}(t)$ is the per unit system frequency at time t, $p_{mp.u.}(t)$, $p_{ep.u.}(t)$ and $p_{ap.u.}(t)$ are the unit mechanical, electrical and accelerating powers respectively.

$$\frac{2H}{\omega_{syn}}\omega_{p.u.}(t)\frac{d\omega(t)}{dt} = p_{mp.u.}(t) - p_{ep.u.}(t) = p_{ap.u(t)} \qquad (8)$$

The H in equation (8) relates to the rotational inertia of the specific generator in question. Long-term dynamic simulations work under the base assumption, referred to as the 'tied-rotor' assumption that all generators move in synchronism with a single system frequency. Therefore, H can be used to reflect the rotational inertia constant of the entire system. The system H can be obtained by normalizing the H constants of each of the generators and some loads (i.e. those with rotational inertia such as rotating machines) to equivalent units and adding them together.

The accelerating power $p_{ap.u}(t)$ refers to the system wide imbalance between generation and load, inclusive of any losses. In some embodiments, the reference bus real power mismatch obtained at (306) is used to provide this value. The reference bus mismatch actually provides only an approximation of the system wide imbalance between generation and load as the imbalance in a physical power system does not typically manifest itself at a single bus, but is rather spread out among the generators in the system. However, for the purposes of system control and the bulk of power system applications, such approximation has little effect on the results. In other embodiments, the power mismatch on multiple buses is used to determine the system wide imbalance and thus the accelerating power.

For discrete time simulations, the use of full differential equations is not required. Accordingly, equation (8) is converted into equation (9) by replacing the derivatives with division where Δt is the time step since the last frequency calculation (i.e. the last iteration of (312)), and Re( ) is the real part of the complex variable in the brackets.

$$\frac{2H}{\omega_{sym}}\omega_{p.u.}(t)\frac{\Delta\omega(t)}{\Delta t} = Re(\Delta S_{Bus1}) \qquad (9)$$

Equation (9) can be rearranged to solve for the frequency change, Δω(t), as shown in equation (10).

$$\Delta\omega(t) = \frac{\omega_{syn}\{Re(\Delta S_{Bus1})\}\Delta t}{2H\omega_{p.u.}(t)} \qquad (10)$$

The system frequency change Δω(t) can then be added to the previous system frequency to find the overall net system frequency.

At (314), one or more control systems use the system frequency calculated at (312) and the complex voltages obtained at (306) to determine the real and reactive power for each bus to achieve predetermined voltage and power flow conditions. For example, the control systems may be droop control, markets or AGC schemes in the case of real power and closed loop control systems in the case of reactive power. Depending on the level of complexity of the control systems (i.e. generator and load models) used, individual generators can oscillate around the system frequency. For example, in some embodiments, only the real and reactive power of the reference bus is adjusted based on the system frequency and the bus voltages, whereas, in other embodiments, the real and reactive power of multiple buses are adjusted based on the system frequency and the bus voltages. Once the real and reactive power is calculated for each bus the new real and reactive powers are provided to the RPF algorithm. The method 300 then proceeds back to (306).

Since the solution to a power flow problem provides a snapshot of the state of a power system it is possible to utilize the power flow solution method to provide a large number of successive snapshots. By performing power flow snapshots, frequency calculations and generator/load updates in a cyclical manner, a series of sequential snapshots are produced, each slightly different from the previous to provide a time-based simulation. In addition, the value of Δt in equation (10) defines the length of time in the simulation timeline between the snapshots.

As is with simulations, one or more of a number of different stopping criteria can be chosen. These include, but are not limited to, user directive, a predetermined condition such as a steady state condition or a defined time on the simulation timeline.

Figure 4:
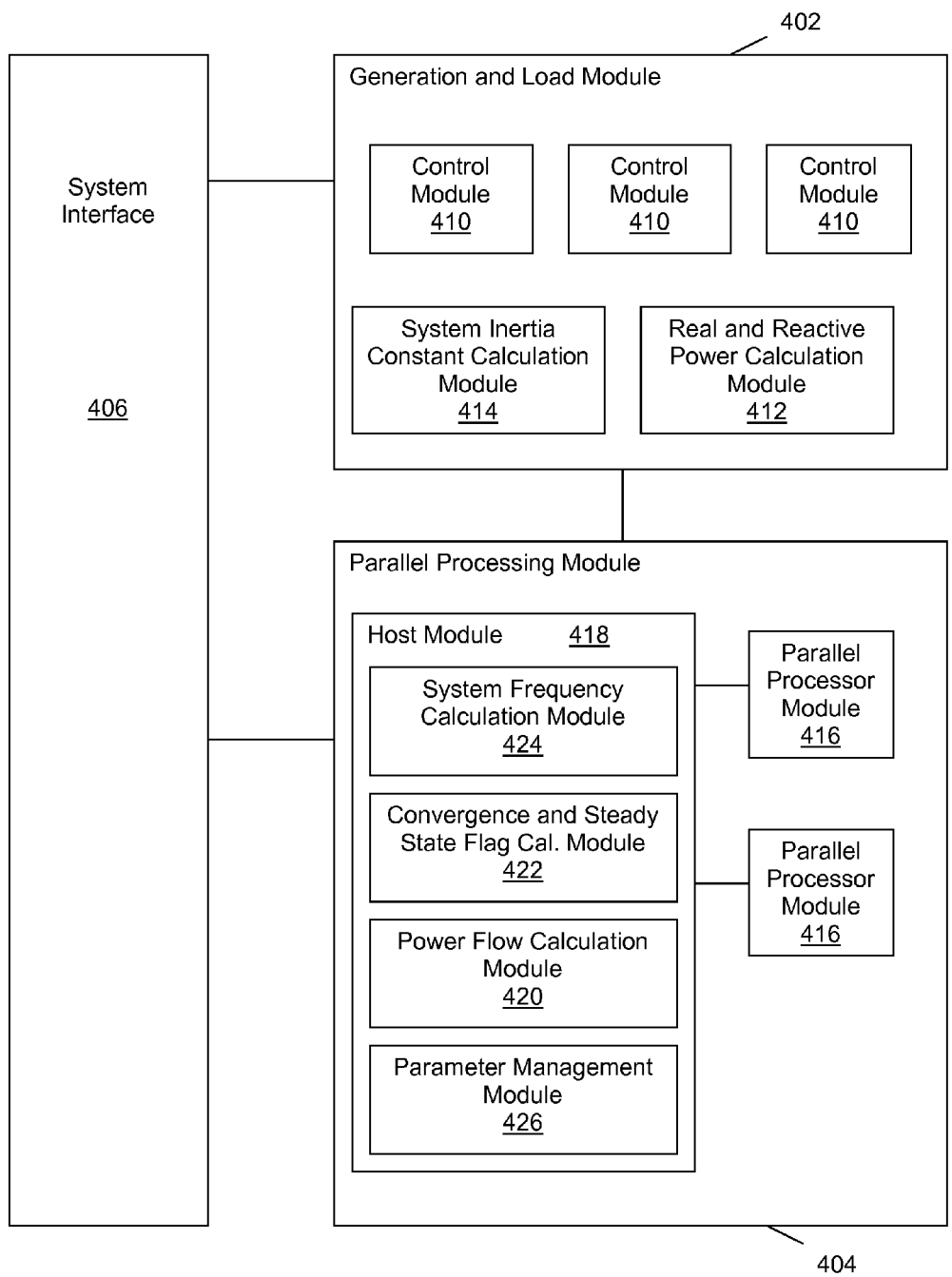
FIG. 4 is a block diagram of a system for implementing the methods of FIGS. 1 to 3 in accordance with an embodiment.

Reference is now made to FIG. 4, which illustrates a block diagram of a system 400 for implementing the methods 100, 200, and 300 of FIGS. 1-3 in accordance with an embodiment. The system 400 includes a generation and load module 402, a parallel processing module 404 and a system interface module 406.

The generation and load module 402 typically comprises a plurality of control modules 410, and a real and reactive power calculation module 412. The generation and load module 402 receives generator and load models for the electrical power system from the system interface 406 and stores each model in one of the control modules 410. The control modules 402 may be memory modules or units. As described above in references to FIG. 3, typically the generator and load models are provided to the generation and load module 402 as part of the initialization process.

The real and reactive power calculation module 412 receives generation and load power levels from the control modules 410 and calculates new real and reactive powers for each bus. Once the new real and reactive powers have been calculated, the real and reactive power calculation module 412 may provide the new real and reactive powers to the parallel processor module 404 for use in a subsequent iteration.

In some embodiments, the generation and load module 402 may also include a system inertia constant calculation module 414. For example, the generation and load module 402 typically includes a system inertia constant calculation module 414 when the system 400 is being used as a power system simulator. The system inertia constant calculation module 414 calculates the system inertia constant H using the inertia constants of the individual generators and loads, and provides the system inertia constant H to the parallel processing module 404. The system inertia constant calculation module 414 may be implemented, for example, in software that is executed by a processor.

The parallel processing module 404 comprises a plurality of parallel processor modules 416 and a host module 418.

The parallel processor modules 416 are configured to execute the RPF algorithm described above in reference to FIG. 1. Specifically, the parallel processor modules 416 may receive the real and reactive powers for each bus and the Ybus matrix from the host module 418 and calculate the complex voltage (magnitude and phase) of each bus.

In some embodiments, each parallel processor module 416 is a single-core processor. In these embodiments, each processor may be configured to solve equation (6) for a particular bus or set of buses. Accordingly, a number of the calculations can be performed simultaneously. Generally, the greater the number of processors the more equations can be solved simultaneously.

In other embodiments, each parallel processor module 416 is a multi-core processor comprising two or more independent cores (or central processing units (CPUs)). The cores are typically integrated onto a single integrated circuit die. However they may also be integrated onto multiple dies in a single chip package. In these embodiments, each core may be configured to solve equation (6) for a particular bus or set of buses. Accordingly, a number of the calculations can be performed simultaneously. Assuming each processor has the same number of cores, the number of calculations that can be calculated in parallel is typically equal to the number of cores per processor multiplied by the number of processors. Generally, the greater the number of processors and the number of cores per processor, the more equations can be solved simultaneously.

In one embodiment, each parallel processor module 416 is a graphics processing unit (GPU). GPUs were originally designed to offload 3D graphics rendering from a microprocessor. The general trend for GPU design has been increasing the simultaneous number of calculations the processor can perform. This functionality stems directly from the mathematical requirements of graphics processing, which are "embarrassingly parallel" problems. A significant portion of the calculations required to display an image consist of large vector and matrix manipulations, often requiring the same calculation performed on a large number of values. These calculations can be performed in a serial fashion, but often, due to their independence from each other, can be performed in parallel. The current NVIDIA™ Tesla S1070 graphics processor has 960 processing cores, allowing 960 simultaneous independent calculations.

From a computing perspective, the ability to perform a large number of simultaneous calculations requires that the processing core be able to obtain the data it requires with low latency, otherwise clock cycles are wasted as the processor sits idle waiting for data. For this reason GPUs have a different architecture than typical general-purpose processors. The main design changes consist of locating greater amounts of high speed memory closer to the cores, reducing the memory latency, and increasing the bandwidth of the pipelines between the off-chip memory, on-chip memory and processing cores.

An NVIDIA™ CUDA-enabled GPU, for example, is comprised of one or more multiprocessors with each multiprocessor containing 8 scalar processors (cores). The multiprocessor schedules the scalar processors to work in parallel executing one thread each. In one embodiment, each thread is assigned to execute equation (6). Where there are many GPUs that have a large number of scalar processors, hundreds or thousands of parallel executions can be performed.

The host module 418 is responsible for performing basic calculations and interfacing with the generation and load module 402, the system interface 406, and the one or more parallel processor modules 416. The host module 418 may comprise a power flow calculation module 420, a convergence flag and steady state flag calculation module 422, a system frequency calculation module 424, and a parameter management module 426. The host module 418 may be implemented by a computer with one or more general purpose processors. Each processor may have one or more cores. The host module 418 may also be implemented by several host modules electrically coupled together, each including multiple processors.

The power flow calculation module 420 receives the complex voltages calculated by the processor modules 416, and the Ybus matrix and uses this information to calculate the power mismatch of each bus. The calculated power mismatch of each bus may then be used by the convergence flag and steady state flag calculation module 422 to determine whether the system has converged and/or reached a steady state. The power flow calculation module 420 may also calculate the flow of power on lines between buses in the power system and provide this information to the system interface 406. In alternative embodiments, the host module 418 does not comprise a separate power flow calculation module 420 and the power mismatch of each bus is calculated by the parallel processor modules 416 themselves.

The convergence flag and steady state flag calculation module 422 receives the power mismatch information from the power flow calculation module 420 and calculates the convergence flag and the steady state flag. The convergence flag indicates whether the RPF algorithm (and thus the system) has converged. The steady state flag indicates whether the RPF algorithm (and thus the system) has reached a steady state. In some embodiments, the convergence flag is set to 1 when the RPF algorithm has converged and 0 when the RPF algorithm has not converged. In some embodiments, the steady state flag is set to 1 when the RPF algorithm has reached steady state and 0 when the RPF algorithm has not reached steady state.

In some embodiments, the RPF algorithm is said to converge when the power mismatch of each bus, other than the reference bus, is less than a predetermined threshold. In some embodiments, the RPF algorithm is said to have reached a steady state when the power mismatch of all of the buses, including the reference bus, is less than a predetermined threshold.

The system frequency calculation module 424 receives the reference bus power mismatch calculated by the power flow calculation module 420 and the system inertia constant H obtained from the system inertia constant calculation module 414 and calculates the system frequency using the rearranged swing equation shown above as equation (10). In some embodiments, the system frequency calculation module 424 may only determine the system frequency after the convergence flag is set to 1 by the convergence flag and steady state flag calculation module 422.

As described above in reference to FIG. 3, at the completion of the RPF algorithm the reference bus may be left with a residual mismatch. The real portion of the mismatch can be used to calculate the system frequency. In one embodiment, the system frequency is calculated using the swing equation which describes the acceleration and deceleration of generators under mechanical input and electrical output. Once the system frequency calculation module 424 calculates the system frequency, it may provide this information to the generation and load module 402 where it may be used to calculate new real and reactive powers for the generators and loads.

The parameter management module 426 manages the parameters of the system. Typically, the parameter management module 426 is responsible for receiving the Ybus matrix from the system interface 406 and providing a copy to the parallel processor modules 416. As described above in relation to FIGS. 1, 2, and 3, the Ybus matrix is typically provided to the parameter management module 426 during the initialization process. However, the parameter management module 426 may receive periodic updates to the Ybus from the system interface 406 and update the Ybus matrices on the parallel processor modules 416 accordingly.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for computing a solution to a power flow problem for an electrical power system comprising a plurality of buses, the method comprising:
   (a) providing an admittance matrix for the power system;
   (b) initializing real and reactive power for each bus;
   (c) initializing complex voltages for each bus;
   (d) performing a Jacobi power flow calculation for each bus to determine the complex voltage for each bus, the Jacobi power flow calculation using the admittance matrix, real and reactive power for the plurality of buses, and initial complex voltages for the plurality of buses as inputs, wherein at least two Jacobi power flow calculations are performed concurrently on a plurality of parallel processors;
   (e) determining a power mismatch at each bus based on the complex voltage for each bus;
   (f) determining whether the Jacobi power flow calculations have converged based on the power mismatches; and
   (g) if the Jacobi power flow calculations have not converged, repeating steps (d) to (g); and
   (h) adjusting the real power and reactive power of at a least one bus based on the power mismatches.

2. The method of claim 1, further comprising the step of adjusting the real power and reactive power of at least one bus based on the power mismatches only when the Jacobi power flow calculations are not in the steady state.

3. The method of claim 2, wherein the Jacobi power flow calculations are in the steady state when the power mismatch at each bus is below a predetermined threshold.

4. The method of claim 1, further comprising:
   (h) calculating a frequency of the power system using the power mismatch of at least one bus;
   (i) estimating the real and reactive power for each bus to achieve a steady state using a control system model, the control system model using at least one of the system frequency, power mismatches and complex voltages as an input; and
   (j) repeating steps (d) to (i) at least once until the method is discontinued.

5. The method of claim 4, wherein the plurality of buses comprises a reference bus and the system frequency is calculated from the power mismatch of the reference bus.

6. The method of claim 5, wherein the system frequency is calculated using a generator swing equation.

7. The method of claim 6, wherein the system frequency is based on a frequency change calculated in accordance with the following equation $$\Delta\omega(t) = \frac{\omega_{syn}\{Re(\Delta S_{Bus1})\}\Delta t}{2H\omega_{p.u.}(t)}$$

wherein $\Delta\omega(t)$ is the frequency change, $\omega_{syn}$ is a synchronous frequency of the power system, $\omega_{p.u.}(t)$ is a per unit system frequency at time t, H is a rotational inertia constant of the power system, $\Delta t$ is a time step from a previous iteration, and $\Delta S_{Bus1}$ is the power mismatch of the reference bus.

8. The method of claim 1, wherein performing the Jacobi power flow calculation comprises solving the following equation $$V_k(i+1) = \frac{1}{Y_{kk}}\left[\frac{S_k^*}{V_k^*(i)} - \sum_{n=1,n\neq k}^{N} Y_{kn}V_n(i)\right]$$

wherein V is the complex voltage, Y is an admittance of the admittance matrix, S is a complex power, k and n represent specific buses, an asterisk superscript indicates a complex conjugate, and i is an iteration number.

9. The method of claim 1, wherein each bus is treated as a load bus during the Jacobi power flow calculations.

10. The method of claim 1, wherein the plurality of parallel processors form at least one graphics processing unit.

11. A system for computing a solution to a power flow problem for an electrical power system comprising a plurality of buses, the system comprising:
(a) at least one memory module for storing an admittance matrix for the power system, real power and reactive power for each bus, and initial complex voltage for each bus; and
(b) at least one parallel processor module coupled to the at least one memory module for:
(i) performing a Jacobi power flow calculation for each bus to determine the complex voltage for each bus, the Jacobi power flow calculation using the admittance matrix, real power and reactive power for each bus, and the complex voltage for each bus as inputs, wherein the at least one parallel processor module comprises a plurality of independent cores and at least two Jacobi Power Flow calculations are performed concurrently on the plurality of cores;
(ii) calculating a power mismatch at each bus based on the complex voltages; and
(iii) determining whether the Jacobi power flow calculations have converged based on the power mismatches and repeating (i) to (iii) if the Jacobi power flow calculations have not converged; and
(iv) adjusting the real power and reactive power of at a least one bus based on the power mismatches.

12. The system of claim 11, further comprising a steady state flag calculation module for receiving the power mismatch for each bus and determining whether the Jacobi power flow calculations are converged.

13. The system of claim 12, wherein the steady state flag calculation module determines whether the Jacobi power flow calculations have converged when the power mismatch of each bus is below a predetermined threshold.

14. The system of claim 11, further comprising:
(c) a system frequency calculation module for receiving the power mismatch for at least one bus and calculating a system frequency using the power mismatch of the at least one bus; and
(d) a real and reactive power calculation module for estimating the real and reactive power vectors for each bus to achieve a steady state using a control system model, the control system model using at least one of the system frequency, power mismatches, and complex voltages as input.

15. The system of claim 14, wherein the system frequency calculation module calculates the system frequency using a generator swing equation.

16. The system of claim 15, wherein the plurality of buses comprises a reference bus and the system frequency calculation module calculates the system frequency based on the power mismatch of the reference bus.

17. The system of claim 16, wherein the system frequency calculation module determines the system frequency from a frequency change calculated in accordance with the following equation $$\Delta\omega(t) = \frac{\omega_{syn}\{Re(\Delta S_{Bus1})\}\Delta t}{2H\omega_{p.u.}(t)}$$

wherein $\Delta\omega(t)$ is the frequency change, $\omega_{syn}$ is a synchronous frequency of the power system, $\omega_{p.u.}(t)$ is a per unit system frequency at time t, H is a rotational inertia constant of the power system, $\Delta t$ is a time step from a previous iteration, and $\Delta S_{Bus1}$ is the power mismatch of the reference bus.

18. The system of claim 11, wherein performing the Jacobi power flow calculation comprises solving the following equation $$V_k(i+1) = \frac{1}{Y_{kk}}\left[\frac{S_k^*}{V_k^*(i)} - \sum_{n=1,n\neq k}^{N} Y_{kn}V_n(i)\right]$$

wherein V is the complex voltage, Y is an admittance of the admittance matrix, S is a complex power, k and n represent specific buses, an asterisk superscript indicates a complex conjugate, and i is an iteration number.

19. The system of claim 11, wherein each bus is treated as a load bus during the Jacobi power flow calculations.

20. The system of claim 11, wherein the at least one parallel processor module is a graphics processing unit.

21. An apparatus for computing a solution to a power flow problem for an electrical power system comprising a plurality of buses, the apparatus comprising:
(a) at least one processor comprising a plurality of cores; and
(b) memory coupled to the at least one processor for storing an admittance matrix for the power system, real power and reactive power for each bus, and an initial complex voltage for each bus;
(c) wherein the at least one processor is configured to:
(i) perform a Jacobi power flow calculation for each bus to determine the complex voltage for each bus, the Jacobi power flow calculation using the admittance matrix, the real power and reactive power for each bus, and the initial complex voltage for each bus as inputs, wherein at least two Jacobi power flow calculations are performed concurrently on the plurality of cores;
(ii) calculate a power mismatch at each bus based on the complex voltages;
(iii) determine whether the Jacobi power flow calculations have converged based on the power mismatch and repeat (i) to (iii) if the Jacobi power flow calculations have not converged; and
(iv) adjusting the real power and reactive power of at a least one bus based on the power mismatches.

* * * * *